(12) United States Patent
Yamaki (10) Patent No.: US 8,406,016 B2
(45) Date of Patent: Mar. 26, 2013

(54) POWER SUPPLY CIRCUIT AND INFORMATION PROCESSING APPARATUS FOR POWER FACTOR CORRECTION AND STABLE POWER SUPPLY

(75) Inventor: Motoi Yamaki, Tokyo (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 12/694,799

(22) Filed: Jan. 27, 2010

(65) Prior Publication Data
US 2010/0195359 A1 Aug. 5, 2010

(30) Foreign Application Priority Data
Feb. 3, 2009 (JP) ............... P2009-022802

(51) Int. Cl.
*H02M 3/335* (2006.01)
(52) U.S. Cl. ............... 363/21.12; 363/21.04
(58) Field of Classification Search ........... 363/97, 363/20, 21.04, 21.09, 21.1, 21.11, 21.12, 363/21.17, 21.18
See application file for complete search history.

(56) References Cited

U.S. PATENT DOCUMENTS

| | | | | |
|---|---|---|---|---|
| 5,619,404 A * | 4/1997 | Zak | ............ | 363/21.09 |
| 6,324,079 B1 * | 11/2001 | Collmeyer et al. | ........ | 363/21.15 |
| 6,639,813 B2 * | 10/2003 | Yamagishi et al. | ........ | 363/21.12 |
| 6,717,827 B2 * | 4/2004 | Ota | ................ | 363/21.12 |
| 6,944,034 B1 * | 9/2005 | Shteynberg et al. | ........ | 363/21.13 |
| 7,105,945 B2 * | 9/2006 | Shiotsu et al. | ............... | 307/10.8 |
| 7,319,600 B2 * | 1/2008 | Lee et al. | ................ | 363/21.02 |
| 2005/0213352 A1 * | 9/2005 | Lys | ............................... | 363/17 |

FOREIGN PATENT DOCUMENTS

| | | |
|---|---|---|
| JP | 10-150769 | 6/1998 |
| JP | 2004-304885 | 10/2004 |
| JP | 2005-237185 | 9/2005 |
| JP | 2008-043150 | 2/2008 |

OTHER PUBLICATIONS

S. Baba, "8-Pins Continuous Conduction Mode PFC: Power of IC." Transistor Technology, pp. 213-214 (2008).

* cited by examiner

*Primary Examiner* — Adolf Berhane
*Assistant Examiner* — Emily Pham
(74) *Attorney, Agent, or Firm* — Finnegan, Henderson, Farabow, Garrett & Dunner LLP (57) ABSTRACT

A power supply circuit includes a rectifying unit for outputting a rectified input voltage, a transformer for receiving the voltage and outputting an induced voltage based on the input voltage, a first smoothing unit for smoothing the induced voltage to output a first output voltage, a detecting unit for outputting an error signal corresponding to the difference between the first output voltage and a reference voltage, and an insulating unit for receiving the error signal and outputting a signal corresponding to the error signal. The input and output terminals of the insulating unit are insulated. The circuit also includes a controlling unit for outputting a control signal for selectively inputting the input voltage into the transformer on basis of the signal from the insulating unit, and also includes a switching unit connected to the transformer for selectively inputting the input voltage into the transformer, based on the control signal.

8 Claims, 5 Drawing Sheets

POWER SUPPLY CIRCUIT AND INFORMATION PROCESSING APPARATUS FOR POWER FACTOR CORRECTION AND STABLE POWER SUPPLY

BACKGROUND OF THE INVENTION

1. Field of the Invention

The present invention relates to a power supply circuit and an information processing apparatus.

2. Description of the Related Art

A PFC (Power Factor Correction) circuit, for example, is provided in an information processing apparatus driven by an AC (alternating-current) power supply (so-called commercial power supply) such as 50 Hz or 60 Hz in order to efficiently obtain power from the AC power supply without deteriorating a power factor. For example, a technique for the PFC circuit is described in Baba, Seitaro. "8-Pins Continuous Conduction Mode PFC: Power of IC." Transistor Technology, March 2008: 213-214.

SUMMARY OF THE INVENTION

In a related art for a PFC circuit, a non-insulated chopper circuit is used, for example, to realize the PFC circuit. The PFC circuit realized in the non-insulated chopper circuit is called active PFC circuit, for example. Some PFC circuits may be called passive PFC circuit in addition to the active PFC circuit. The passive PFC circuit is directed for using a low frequency inductor to change a phase of current, thereby correcting a power factor. The passive PFC circuit is configured to use a low frequency inductor and thus requires a large inductance. Therefore, the passive PFC circuit is made larger in its shape and weight, which is a large issue in downsizing for substrate design and/or structural design. In the following, the related arts for the active PFC circuit and the passive PFC circuit will be collectively referred to as "related art".

Further, in an information processing apparatus using a related art PFC circuit (referred to as "information processing apparatus in related art" below), an insulated circuit (main power supply circuit) such as transformer needs to be provided behind the PFC circuit. The above structure is directed for preventing an inrush current from occurring, and for stably obtaining a predetermined voltage (power supply) for driving the information processing apparatus in related art. Since the PFC circuit functions as a kind of power supply circuit, the information processing apparatus in related art consequently includes a plurality of power supplies in the above case. Thus, since the information processing apparatus in related art including the related art PFC circuit includes a plurality of power supplies, its cost increases more than the structure including one power supply circuit. The information processing apparatus in related art including the related art PFC circuit needs to control an activation timing or load between the PFC circuit and the main power supply circuit, for example, in order to stably obtain the power supply for driving. Thus, the information processing apparatus in related art including the related art PFC circuit may not stably obtain the power supply used for driving without performing more complicated control than the structure including one power supply circuit.

In light of the foregoing, it is desirable to provide a novel and improved power supply circuit and information processing apparatus capable of realizing both a correction of power factor and a stable supply of power supply.

According to an embodiment of the present invention, there is provided a power supply circuit including a rectifying unit for rectifying an alternating-current power supply to output a rectified input voltage, an insulated transformer having a primary coil into which the rectified input voltage output from the rectifying unit is selectively input and a secondary coil from which an induced voltage based on the rectified input voltage input to the primary coil is output, a first smoothing unit for smoothing the induced voltage to output a first output voltage, a detecting unit for outputting an error signal corresponding to a difference between the first output voltage and a reference voltage, an insulating unit having an input terminal into which the error signal is input and an output terminal from which a signal corresponding to the input error signal is output, the output terminal being insulated from the input terminal, a controlling unit for outputting a control signal for selectively inputting the rectified input voltage into the primary coil, based on the signal output from the output terminal, and a switching unit connected to the primary coil for selectively inputting the rectified input voltage into the primary coil, based on the control signal.

With such a power source circuit arranged as described above, it is possible to realize both a correction of power factor and a stable supply of power supply.

The rectifying unit may rectify the alternating-current power supply without smoothing.

The insulated transformer may include a plurality of secondary coils for outputting an induced voltage based on the rectified input voltage applied to the primary coil The first smoothing unit may include a plurality of smoothing circuits, each of which is connected to each of the plurality of secondary coils and smoothes an induced voltage output from the each of the secondary coils.

The turns of each of the plurality of secondary coils may be different from one another.

The power supply circuit may further include a second smoothing circuit for smoothing the rectified input voltage output from the primary coil and outputting a second output signal corresponding to the rectified input voltage.

According to another embodiment of the present invention, there is provided an information processing apparatus including a power supply circuit for outputting a first output voltage based on an alternating-current power supply, and also including a load circuit powered by the first output voltage. The power supply circuit includes a rectifying unit for rectifying an alternating-current power supply to output a rectified input voltage, an insulated transformer having a primary coil into which the rectified input voltage output from the rectifying unit is selectively input and a secondary coil from which an induced voltage based on the rectified input voltage input to the primary coil is output, a first smoothing unit for smoothing the induced voltage to output a first output voltage, a detecting unit for outputting an error signal corresponding to a difference between the first output voltage and a reference voltage, an insulating unit having an input terminal into which the error signal is input and an output terminal from which a signal corresponding to the input error signal is output, the output terminal being insulated from the input terminal, a controlling unit for outputting a control signal for selectively inputting the rectified input voltage into the primary coil, based on the signal output from the output terminal, and a switching unit connected to the primary coil for selectively inputting the rectified input voltage into the primary coil, based on the control signal.

With such an information processing apparatus arranged as described above, it is possible to realize both a correction of power factor and a stable supply of power supply.

According to the present invention, it is possible to realize both a correction of power factor and a stable supply of power supply.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made below in the following order:
1. Approach according to embodiments of the present invention
2. Power supply circuit according to first embodiment of the present invention
3. Power supply circuit according to second embodiment of the present invention (Approach According to Embodiments of the Present Invention)

An approach for realizing both a correction of power factor and a stable supply of power supply according to an embodiment of the present invention will be described prior to explaining a power supply circuit according to the embodiment of the present invention. The correction of power factor according to an embodiment of the present invention is directed for making the power factor (0≦power factor≦1) closer to "1 (ideal state)".

[Issues on Related Art]

The issues when the related art is applied will be described first more specifically prior to explaining the approach according to the embodiments of the present invention.

Figure 1:
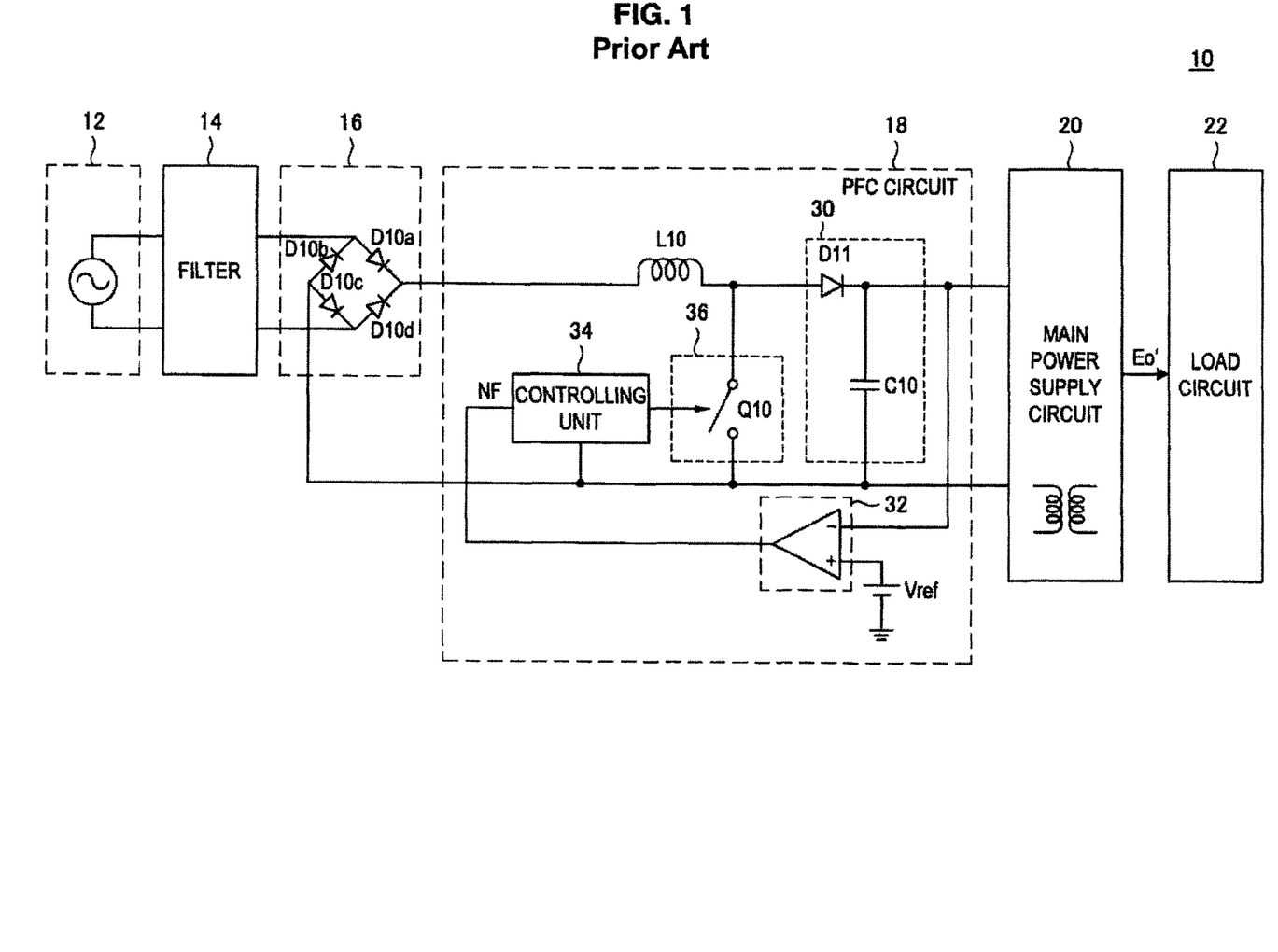
FIG. 1 is an explanatory diagram for explaining the issues when a related art is applied.

[1] Structure Example of Information Processing Apparatus 10 in Related Art Including Related Art PFC Circuit FIG. 1 is an explanatory diagram for explaining the issues when the related art is applied. FIG. 1 shows one structure example of the information processing apparatus 10 in related art including a related art PFC circuit. An AC power supply 12 shown in FIG. 1 indicates a power supply to be input into the information processing apparatus 10 via an outlet (not shown), for example. The AC power supply 12 may include an AC power supply such as 50 Hz or 60 Hz (so-called commercial AC power supply), for example.

The information processing apparatus 10 includes a filter 14, a rectifying circuit 16, a PFC circuit 18, a main power supply circuit 20 and a load circuit 22.

The filter 14 is configured with a bandpass filter or the like, for example, and filters the AC power supply 12 to remove noises and the like from the AC power supply 12.

The rectifying circuit 16 rectifies the AC power supply filtered in the filter 14 and outputs an input rectified voltage. The rectifying circuit 16 performs half-wave rectification or full-wave rectification on the AC power supply, for example, to output the input rectified voltage. FIG. 1 shows an example in which the rectifying circuit 16 is configured with a bridge full-wave rectifying circuit configured of four diodes D10a to D10d.

The PFC circuit 18 is connected between the rectifying circuit 16 and the main power supply circuit 20 to correct a power factor based on the input rectified voltage output from the rectifying circuit 16 and to output a non-insulated voltage. More specifically, the PFC circuit 18 makes a frequency component (referred to as "harmonic" below) which is integral multiple of a frequency of the AC power supply such as 50 Hz or 60 Hz in the current flowing through the PFC circuit 18 (referred to as "basic frequency" below) closer to a sinusoidal wave, thereby correcting the power factor. FIG. 1 shows one example in which the PFC circuit 18 is configured with a boost chopper circuit, where an input rectified voltage (voltage signal) to be input is selectively applied to a choke coil (coil L10) to restrict a current flowing at one time and to correct a power factor. The PFC circuit 18 controls the switching of a switching unit 36 to boost the input rectified voltage, thereby outputting a boosted non-insulated voltage.

[Structure Example of PFC Circuit 18]

The PFC circuit 18 includes the coil L10, a smoothing unit 30, a detecting unit 20, a controlling unit 34 and the switching unit 36.

The coil L10 prevents a current having a high frequency beyond basic frequency, for example. In other words, the coil L10 serves as a choke coil. An input rectified voltage output from the rectifying circuit 16 is selectively input into the coil L10 through the switching operation of the switching unit 36. In the PFC circuit 18, a current flowing at one time is restricted through the switching operation of the switching unit 36, for example, and pressure rising (or pressure lowering) is controlled.

The smoothing unit 30 smoothes the input rectified voltage (boosted input rectified voltage) output from the coil L10 and outputs a non-insulated voltage having the input rectified voltage smoothed.

A reference voltage Vref and a non-insulated voltage are input into the detecting unit 32 and an error signal NF corresponding to a difference between the non-insulated voltage and the reference voltage Vref is output. FIG. 1 shows one example in which the detecting unit 32 is configured with a differential amplifier.

The controlling unit 34 outputs a control signal for controlling the switching in the switching unit 36 based on the error signal NF. The controlling unit 34 outputs high-level and low-level control signals based on whether the error signal NF exceeds a set threshold value, for example.

The switching unit 36 includes a switching element Q10, and selectively turns ON/OFF (switching operation) depending on a signal level of the control signal output from the controlling unit 34.

The PFC circuit 18 corrects a power factor based on the input rectified voltage output from the rectifying circuit 16 and outputs a non-insulated voltage having the input rectified voltage boosted (or lowered) with the above structure, for example. Thus, the PFC circuit 18 may be a kind of power supply circuit The main power supply circuit 20 is configured with an insulated circuit such as transformer to supply an output voltage Eo' having a predetermined magnitude to the load circuit 22. The main power supply circuit 20 smoothes a voltage to be induced in a secondary coil of the transformer based on the non-insulated voltage input into a primary coil of the transformer, thereby outputting the output voltage Eo' (DC voltage). The main power supply circuit 20 includes a transformer whose coil turns are previously adjusted, thereby to output the output voltage Eo' having a predetermined magnitude.

The load circuit 22 is a schematic example of various circuits for realizing the respective functions included in the information processing apparatus 10, and is driven at the output voltage Eo' supplied from the main power supply circuit 20 as a power supply.

The AC power supply 12 can use the output voltage Eo' converted into the DC voltage as a power supply to drive the information processing apparatus 10 in the structure of FIG. 1, for example. There has been described above the structure in which the main power supply circuit 20 includes the transformer, but the structure is not limited thereto.

[2] Issues on Information Processing Apparatus 10 in Related Art

The AC power supply 12 can use the output voltage Eo' converted into the DC voltage as a power supply to drive the information processing apparatus 10 in the structure of FIG. 1. However, the information processing apparatus 10 needs to additionally provide the main power supply circuit 20 configured of an insulated circuit such as transformer behind the PFC circuit 18 (a kind of power supply circuit) for outputting a non-insulated voltage as shown in FIG. 1. Thus, the following issues (i) and (ii), for example, remain in the information processing apparatus 10 in the structure shown in FIG. 1.

(i) First Issue: Issue on Increase in Cost

Since the information processing apparatus 10 having the structure shown in FIG. 1, for example, needs to include the two power supply circuits as the PFC circuit 18 and the main power supply circuit 20, its cost increases more than in the structure including one power supply circuit.

(ii) Second Issue: Issue on Complicated Control

The information processing apparatus 10 having the structure shown in FIG. 1, for example, needs to control the PFC circuit 18 and the main power supply circuit 20, respectively, in order to stably obtain the output voltage Eo' serving as a power supply. The control for stably outputting the output voltage Eo' may include a control of activation timing or a control of load between the PFC circuit 18 and the main power supply circuit 20, for example. Thus, the information processing apparatus 10 having the structure shown in FIG. 1, for example, may not stably obtain the power supply used for driving the load circuit 22 without performing more complicated control than in the structure including one power supply circuit.

[Approach According to Embodiments of the Present Invention]

Attention is paid to the fact that the above issues (i) and (ii) are due to a plurality of power supply circuits, for example, to realize both a correction of power factor and a stable supply of power supply in one power supply circuit in the embodiments of the present invention. More specifically, the embodiments of the present invention replace the choke coil (corresponding to the coil L10) of the boost chopper circuit configuring the PFC circuit 18 of FIG. 1 with an insulated transformer, thereby realizing a power supply circuit integrating the PFC circuit and the main power supply circuit together.

There will be described below a structure of the power supply circuit according to an embodiment of the present invention capable of realizing the approach according to the embodiment of the present invention. There will be exemplified below a case in which the power supply circuit according to an embodiment of the present invention is provided in the information processing apparatus, but the structure is not limited thereto. For example, the power supply circuit according to an embodiment of the present invention can be realized as a different power supply apparatus from the information processing apparatus, such as AC (Alternating Current) adaptor.

(Power Supply Circuit According to First Embodiment)

Figure 2:
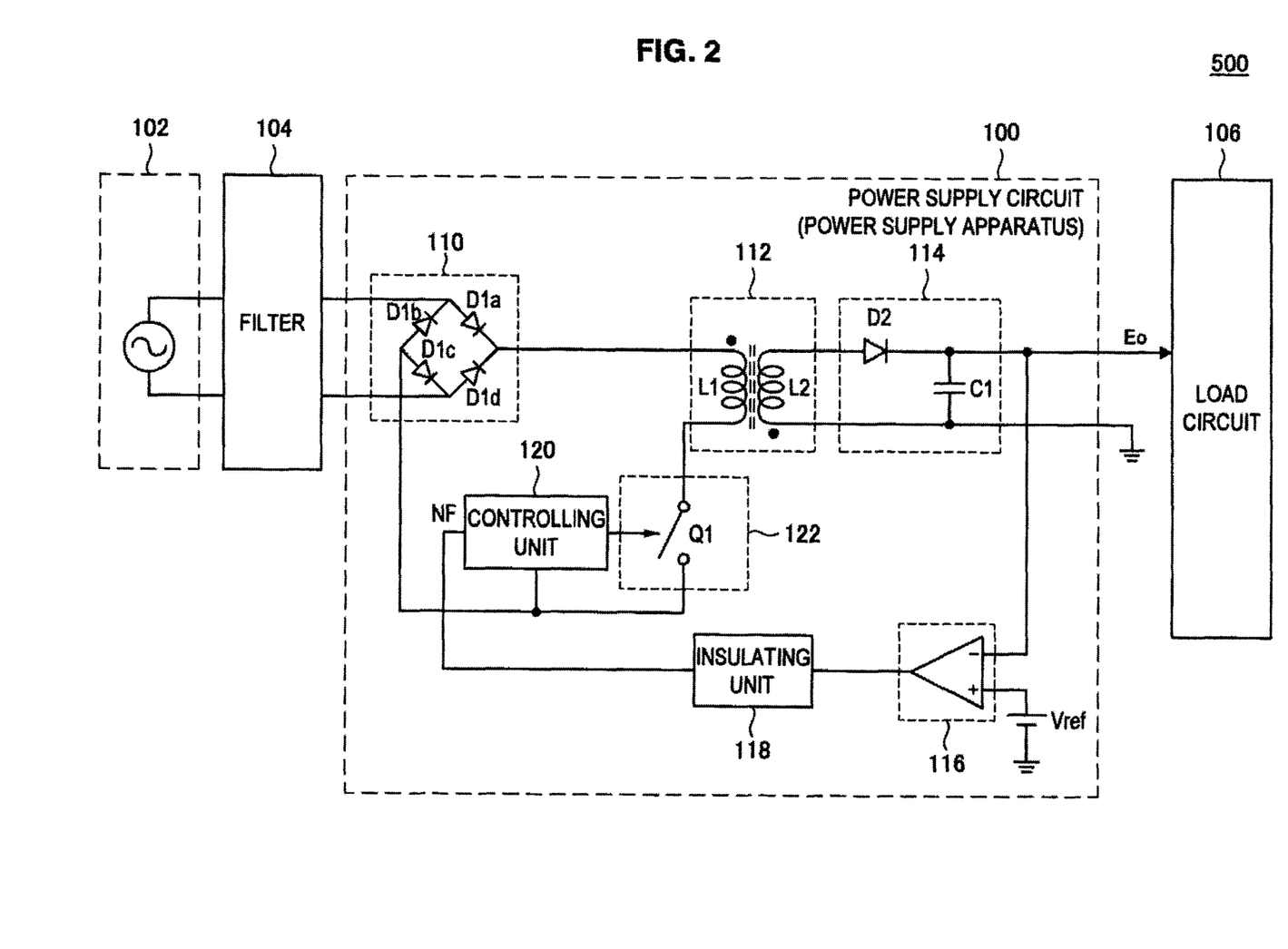
FIG. 2 is an explanatory diagram for explaining one structure example of a power supply circuit according to a first embodiment of the present invention.

FIG. 2 is an explanatory diagram for explaining one structure example of a power supply circuit 100 according to a first embodiment of the present invention. FIG. 2 shows one structure example of an information processing apparatus 500 according to the first embodiment including the power supply circuit 100. An AC power supply 102 shown in FIG. 2 is a power supply input into the information processing apparatus 500 via an outlet (not shown) or the like, for example. The AC power supply 102 can include an AC power supply such as 50 Hz or 60 Hz (so-called commercial AC power supply), but is not limited thereto.

The information processing apparatus 500 includes a filter 104, a power supply circuit 100 and a load circuit 106.

The filter 104 filters the AC power supply 102 to remove noises and the like from the AC power supply 102. The filter 104 is configured of a bandpass filter or low-pass filter, for example, but is not limited thereto.

The power supply circuit 100 serves as both the PFC circuit and the main power supply circuit. More specifically, the power supply circuit 100 corrects a power factor based on the AC power supply filtered in the filter 104 to output a first output voltage Eo (DC voltage) capable of serving as a power supply for driving the load circuit 106.

[Structure Example of Power Supply Circuit 100]

The power supply circuit 100 includes a rectifying unit 110, an insulated transformer 112, a smoothing unit 114 (first smoothing unit), a detecting unit 116, an insulating unit 118, a controlling unit 120 and a switching unit 122.

The rectifying unit 110 rectifies the AC power supply filtered in the filter 104 to output an input rectified voltage. The rectifying unit 110 performs half-wave rectification or full-wave rectification on the AC power supply, for example, to output the input rectified voltage.

FIG. 2 shows an example in which the rectifying unit 110 is configured with a bridge full-wave rectifying circuit configured of four diodes D1$a$ to D1$d$ and rectifies the AC power supply without smoothing. For example, since the power supply circuit 100 can prevent a change in phase of the AC power supply, which may occur due to a capacitor used for the smoothing, with the structure in which the rectifying unit 110 is not smoothed, a deterioration in power factor (power factor's approaching to "0") can be prevented. Thus, the power supply circuit 100 includes the rectifying unit 110 having the structure in which the smoothing is not performed (that is, the structure in which the DC voltage is not output), thereby further correcting the power factor. Of course, the rectifying unit 110 according to an embodiment of the present invention is not limited to the structure employing the bridge full-wave rectifying circuit.

The insulated transformer 112 has a primary coil L1 connected to the rectifying unit 110 and the switching unit 122, and a secondary coil L2. The primary coil L1 is selectively input an input rectified voltage output from the rectifying unit 110 in response to the switching operation of the switching unit 122. The secondary coil L2 outputs an induced voltage based on the input rectified voltage applied to the primary coil L1 through electromagnetic induction.

The smoothing unit 114 smoothes the induced voltage output from the secondary coil L2 of the insulated transformer 112 and outputs the first output voltage Eo (DC voltage). The first output voltage Eo serves as a power supply for driving the load circuit 106, for example. FIG. 2 shows an example in which the smoothing unit 114 is configured with a half-wave rectifying circuit configured of a diode D2 and a capacitor C1, but the smoothing unit 114 is not limited thereto.

The power supply circuit 100 includes the insulated transformer 112 and the smoothing unit 114, thereby outputting the first output voltage Eo (DC voltage) capable of serving as a power supply for driving the load circuit 106. Thus, the power supply circuit 100 can function as a main power supply circuit like the main power supply circuit 20 of FIG. 1, for example.

The reference voltage Vref and the first output voltage Eo are input into the detecting unit 116 to output an error signal (error signal depending on a difference between the first output voltage Eo and the reference voltage Vref) corresponding to a difference between the first output voltage Eo and the reference voltage Vref. FIG. 2 shows an example in which the detecting unit 116 is configured with a differential amplifier, but the detecting unit 116 is not limited thereto.

The insulating unit 118 has an input terminal into which an error signal output from the detecting unit 116 is input and an output terminal insulated from the input terminal, and outputs a signal corresponding to the error signal input into the input terminal (referred to as "signal NF" below) from the output terminal. The insulating unit 118 is configured of a photo coupler including a light emitting diode at the input terminal side and a photo transistor for receiving a light emitted from the light emitting diode at the output terminal side, but is not limited thereto.

The insulated transformer 112 and the insulating unit 118 are provided so that the power supply circuit 100 can insulate the input side into which the AC power supply is input from the output side from which the first output voltage Eo is output. Thus, the power supply circuit 100 includes the insulated transformer 112 and the insulating unit 118, thereby preventing an inrush current from occurring, and stably obtaining the first output voltage Eo serving as a power supply, for example.

The controlling unit 120 outputs a control signal for controlling the switching in the switching unit 122 based on the signal NF. The controlling unit 120 outputs control signals having high-level and low-level pulses based on whether the signal NF exceeds a set threshold value, for example, but is not limited thereto. The control signal output from the controlling unit 120 turns the switching unit 122 ON at one signal level and turns the switching unit 122 OFF at the other signal level. The ON state of the switching unit 122 means that the input rectified voltage is input into the primary coil L1 of the insulated transformer 112, for example. The control signal output from the controlling unit 120 corresponds to a duty-ratio controlled signal, for example. The controlling unit 120 includes a differential amplifier for outputting a signal corresponding to an error between the signal NF and a reference signal (not shown) having a predetermined magnitude and outputs a control signal, for example, but is not limited thereto.

The controlling unit 120 outputs a control signal whose oscillation frequency is 50 kHz or more, for example, through the duty ratio control. The switching unit 122 performs the switching operation based on the control signal whose oscillation frequency is higher than the basic frequency as described above so that a current intermittently flows through the primary coil L1 of the insulated transformer 112 depending on the oscillation frequency of the control signal. In other words, the primary coil L1 of the insulated transformer 112 will serve like the coil L10 (choke coil) of the PFC circuit 18 shown in FIG. 1. Thus, the power supply circuit 100 can correct a power factor of the input current based on the AC power supply 102 and function as the PFC circuit.

The switching unit 122 includes a switching element Q1 to selectively turn ON/OFF (switching operation) depending on a signal level of the control signal output from the controlling unit 120. The switching element Q1 may be an n-channel MOSFET (Metal Oxide Semiconductor Field Effect Transistor) or p-channel MOSFET, for example, but is not limited thereto. For example, the switching unit 122 can include a bipolar transistor as the switching element Q1.

The power supply circuit 100 can realize both the functions of the PFC circuit 18 and the main power supply circuit 20 of FIG. 1 with the above structure. Thus, the power supply circuit 100 can realize both a correction of power factor and a stable supply of power supply.

The power supply circuit 100 detects the first output voltage Eo output from the first smoothing unit 114 in the detecting unit 116 and selectively inputs the input rectified voltage into the primary coil L1 of the insulated transformer 112 in response to a control signal based on the detection result (error signal). Thus, the power supply circuit 100 can stabilize the first output voltage Eo so that the information processing apparatus 500 including the power supply circuit 100 does not need to additionally provide a stabilizing power supply behind the power supply circuit 100.

Further, the power supply circuit 100 includes a flyback converter circuit using the insulated transformer 112, thereby easily making the pressure rising/pressure lowering setting of the first output voltage Eo.

[Efficiency in Power Supply Circuit 100]

Efficiency in the power supply circuit 100 will be compared with efficiency in the structure (structure of FIG. 1) of the related art configured of the PFC circuit 18 and the main power supply circuit 20 for explanation. The "efficiency" according to the embodiments of the present invention is an index indicative of how much the power obtained from the AC power supply could be converted without waste, which is indicated by 0 [%] to 100 [%] (ideal state), for example.

Figure 3A:
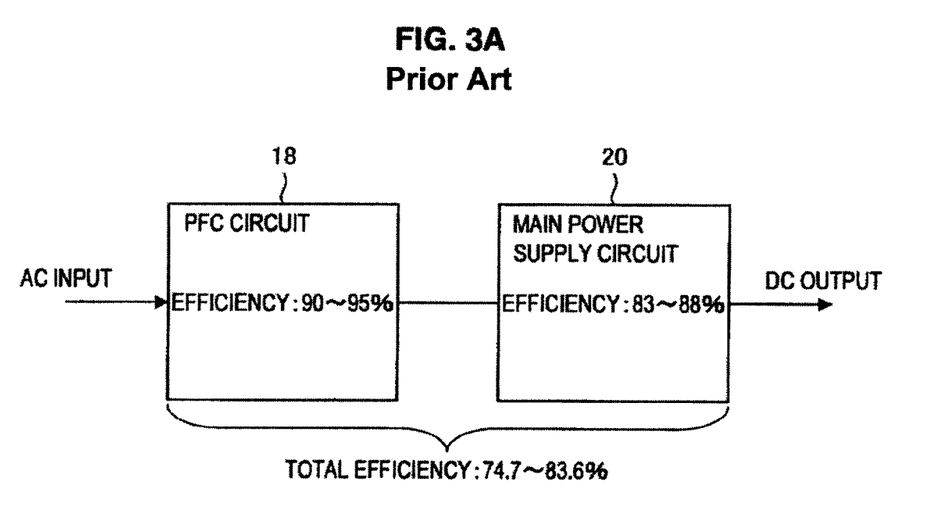
FIG. 3A is an explanatory diagram for explaining one example of efficiency in a structure including a PFC circuit and a main power supply circuit shown in FIG. 1.
Figure 3B:
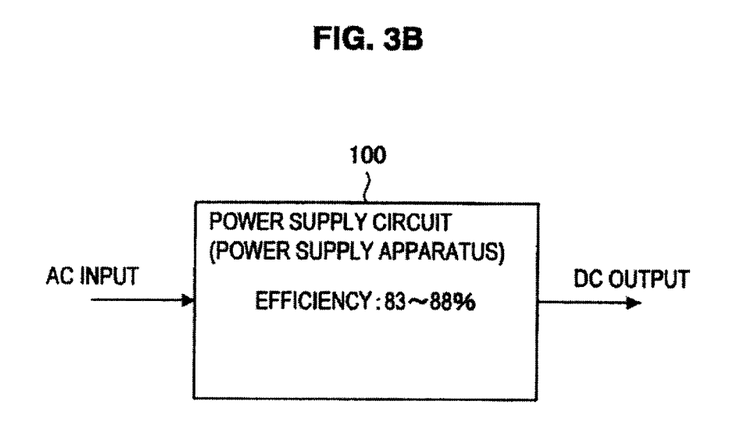
FIG. 3B is an explanatory diagram for explaining one example of efficiency in the power supply circuit according to an embodiment of the present invention.

FIG. 3A is an explanatory diagram for explaining one example of efficiency in the structure including the PFC circuit 18 and the main power supply circuit 20 shown in FIG. 1. Further, FIG. 3B is an explanatory diagram for explaining one example of efficiency in the power supply circuit 100 according to an embodiment of the present invention. FIG. 3A shows one example of the efficiency in the structure in which the main power supply circuit 20 includes the insulated transformer, and FIG. 3B shows one example of the efficiency when the power supply circuit 100 includes a similar insulated transformer as the main power supply circuit 20 of FIG. 3A.

As shown in FIG. 3A, in the related art structure configured of the PFC circuit 18 and the main power supply circuit 20, the two power supply circuits as the PFC circuit 18 and the main power supply circuit 20 are provided. Thus, the efficiency (total efficiency) in the related art structure shown in FIG. 3A is on the order of 74.7 to 83.6 [%].

To the contrary, the power supply circuit 100 is configured of one power supply circuit as shown in FIG. 3B. Thus, the efficiency in the power supply circuit 100 is on the order of 83 to 88 [%] like the main power supply circuit 20 of FIG. 3A, for example.

Thus, the power supply circuit 100 can realize efficiency equal to or more than the efficiency in the related art structure configured of the PFC circuit 18 and the main power supply circuit 20.

With reference to FIG. 2 again, there will be described the constituents of the information processing apparatus 500 including the power supply circuit 100. The load circuit 106 is a schematic example of various circuits for realizing the respective functions provided in the information processing apparatus 500, which is driven at the first output voltage Eo supplied from the power supply circuit 100 as a power supply. The load circuit 106 may include various processing circuits such as MPU (Micro Processing Unit) and GPU (Graphics Processing Unit), magnetic recording mediums such as hard disk, various devices and the like. The various devices may include display devices such as LCD (Liquid Crystal Display), optical disk devices such as Blu-ray (registered trademark) disk drive, and the like, but are not limited thereto.

As described above, the power supply circuit 100 according to the first embodiment of the present invention replaces the choke coil (corresponding to the coil L10) of the boost chopper circuit configuring the PFC circuit 18 shown in FIG. 1 with the insulated transformer, thereby realizing the power supply circuit integrating the PFC circuit and the main power supply circuit together. Thus, the power supply circuit 100 can realize both a correction of power factor and a stable supply of power supply.

Furthermore, the information processing apparatus 500 according to the first embodiment of the present invention includes the power supply circuit 100. Thus, since the information processing apparatus 500 does not need to include a plurality of power supply circuits unlike the information processing apparatus 10 in related art, the number of parts in the power supply circuit can be further reduced than in the information processing apparatus 10, thereby improving reliability of the power supply circuit (for example, reduction in failure rate). Further, since the information processing apparatus 500 does not need to include a plurality of power supply circuits unlike the information processing apparatus 10 in related art, the cost for the power supply circuit can be further reduced than in the information processing apparatus 10, thereby easily controlling the power supply circuit.

[Variant of Power Supply Circuit 100 According to First Embodiment]

There has been described above the structure for outputting one output voltage (first output voltage Eo) as the power supply circuit 100 according to the first embodiment. However, the power supply circuit according to the first embodiment of the present invention is not limited to the above structure and may employ a structure for outputting a plurality of output voltages.

Figure 4:
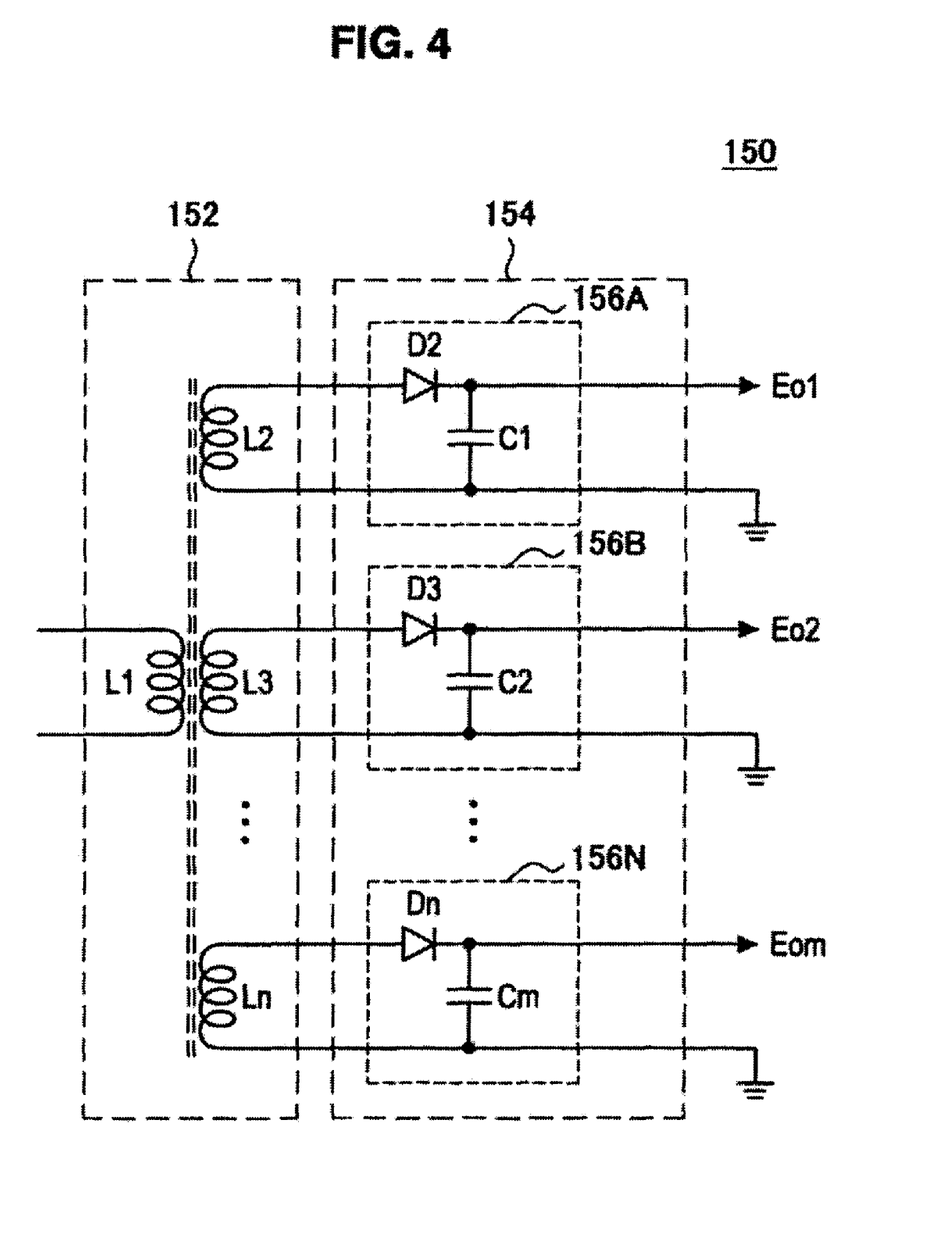
FIG. 4 is an explanatory diagram for explaining one structure example of a power supply circuit according to a variant of the first embodiment of the present invention.

FIG. 4 is an explanatory diagram for explaining one structure example of a power supply circuit 150 according to a variant of the first embodiment of the present invention. In FIG. 4, similar structures as in the power supply circuit 100 shown in FIG. 2 are omitted from the power supply circuit 150 according to the variant. More specifically, FIG. 4 shows an insulated transformer 152 and a smoothing unit 154 (first smoothing unit) both configuring the power supply circuit 150. In the following explanation, the structure of the power supply circuit 150 will be described with reference to FIG. 4 and the description of the similar structures as in the power supply circuit 100 will be omitted. Though not shown in FIG. 4, the power supply circuit 150 inputs one output voltage among a plurality of output voltages output from the smoothing unit 154 into the detecting unit 116. The one output voltage may be an output voltage used as main power supply or an output voltage requiring the best stability.

The insulated transformer 152 has a primary coil L1 and a plurality of secondary coils L2, L3, . . . , Ln (n is an integer of 3 or more). The plurality of secondary coils L2, L3, . . . , Ln output an induced voltage based on the input rectified voltage applied to the primary coil L1 through electromagnetic induction, respectively. The insulated transformer 152 changes the number of coil turns of the plurality of secondary coils L2, L3, . . . , Ln from one another to output a different induced voltage from the secondary coils L2, L3, . . . , Ln, respectively, but is not limited thereto. For example, the insulated transformer 152 may make the number of coil turns of part of or all the secondary coils the same, for example.

The number of secondary coils provided in the insulated transformer 152 and the number of coil turns of each secondary coil are set depending on the number of power supplies required for the load circuit (not shown) provided in the information processing apparatus according to the variant including the power supply circuit 150, and the magnitude of the output voltage.

The smoothing unit 154 is connected with the secondary coils L2, L3, . . . , Ln of the insulated transformer 152, and includes a plurality of smoothing circuits 156A, 156B, . . . , 156N for smoothing the induced voltages output from the secondary coils L2, L3, . . . , Ln, respectively.

Each smoothing circuit configuring the smoothing unit 154 smoothes the induced voltage output from the corresponding secondary coil and outputs the first output voltage Eo1 to Em (m=n−1). Each smoothing circuit configuring the smoothing unit 154 is configured with a half-wave rectifying circuit configured of diodes and capacitors, for example, similarly as the smoothing unit 114 shown in FIG. 2, but is not limited thereto.

The power supply circuit 150 includes the insulated transformer 152 and the smoothing unit 154 shown in FIG. 4, for example, thereby outputting a plurality of output voltages (Eo1 to Eom).

The power supply circuit 150 has the similar structure as the power supply circuit 100 according to the first embodiment shown in FIG. 2 other than the insulated transformer 152 and the smoothing unit 154 shown in FIG. 4. Thus, the power supply circuit 150 can obtain similar effects as the power supply circuit 100.

(Power Supply Circuit According to Second Embodiment)

There has been described above, as the power supply circuit 100 according to the first embodiment, the power supply circuit for outputting the first output voltage Eo (so-called insulated voltage) corresponding to the induced voltage induced in the secondary coil of the insulated transformer 112. However, the power supply circuit according to an embodiment of the present invention is not limited to the structure for outputting an insulated voltage output via the insulated transformer 112 (insulating circuit), and may output a non-insulated voltage output not via the insulating circuit. Thus, there will be shown a power supply circuit capable of outputting an insulated voltage and a non-insulated voltage as a power supply circuit according to a second embodiment of the present invention.

Figure 5:
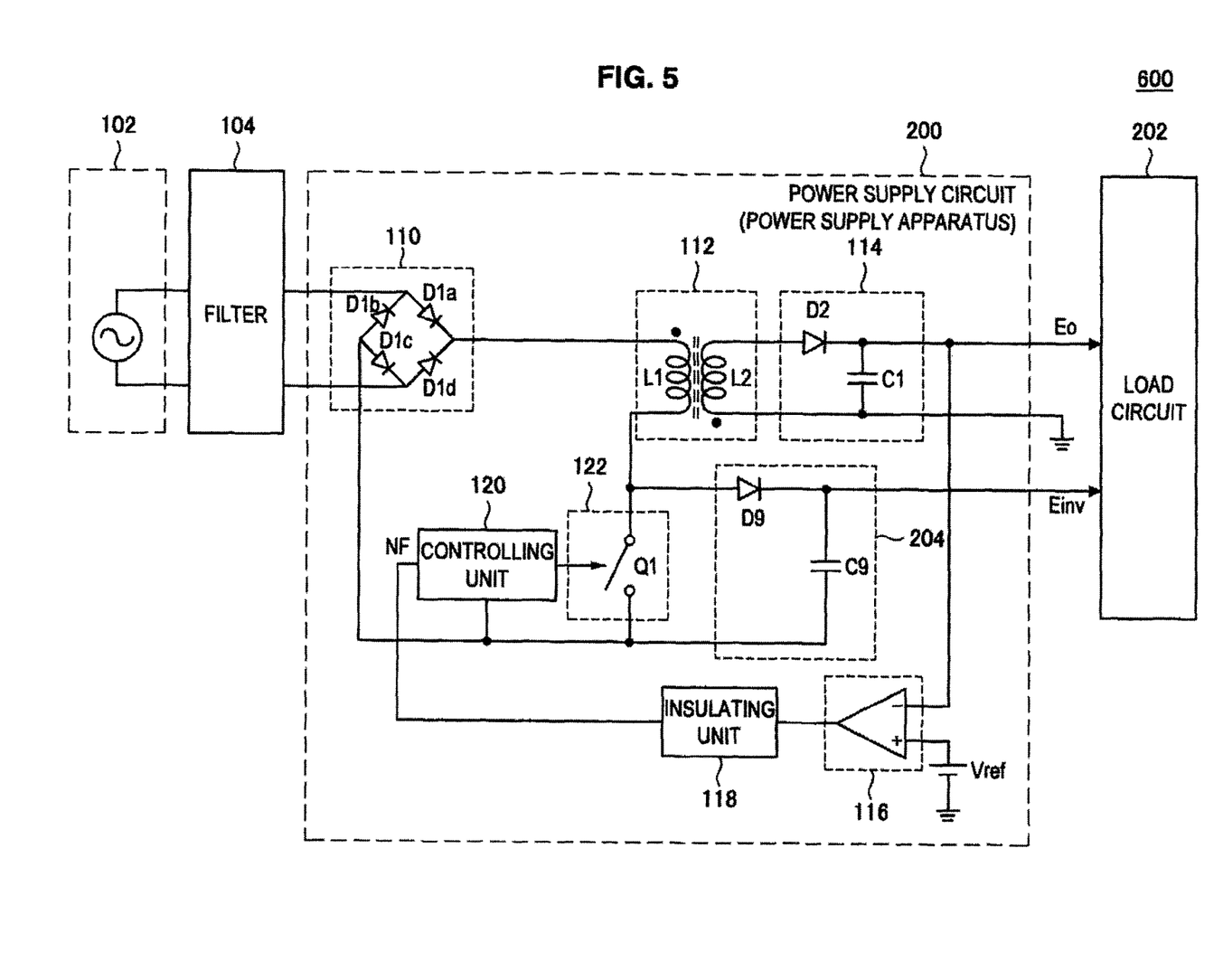
FIG. 5 is an explanatory diagram for explaining one structure example of a power supply circuit according to a second embodiment of the present invention.

FIG. 5 is an explanatory diagram for explaining one structure example of a power supply circuit 200 according to the second embodiment of the present invention. FIG. 5 shows one structure example of an information processing apparatus 600 according to the second embodiment including the power supply circuit 200. The AC power supply 102 shown in FIG. 5 shows a power supply input into the information processing apparatus 600 via an outlet (not shown) or the like, for example, similarly as the AC power supply 102 shown in FIG. 2.

The information processing apparatus 600 includes the filter 104, the power supply circuit 200 and a load circuit 202.

The filter 104 filters the AC power supply 102 to remove noises and the like from the AC power supply 102 similarly as the filter 104 shown in FIG. 2.

The power supply circuit 200 has basically the similar structure as the power supply circuit 100 according to the first embodiment shown in FIG. 2, and serves as both the PFC circuit and the main power supply circuit. More specifically, the power supply circuit 200 corrects a power factor based on the AC power supply filtered in the filter 104, and outputs the first output voltage Eo (DC voltage) capable of serving as a power supply and a second output voltage Einv (DC voltage). The first output voltage Eo is an insulated voltage from the insulated transformer and the second output voltage Einv is a non-insulated voltage.

[Structure Example of Power Supply Circuit 200]

The power supply circuit 200 includes the rectifying unit 110, the insulated transformer 112, the smoothing unit 114 (first smoothing unit), the detecting unit 116, the insulating unit 118, the controlling unit 120, the switching unit 122 and a smoothing unit 204 (second smoothing unit). When a comparison is made between FIG. 2 and FIG. 5, it can be seen that the power supply circuit 200 has basically the similar structure as the power supply circuit 100 shown in FIG. 2 and further includes the smoothing unit 204.

The rectifying unit 110, the insulated transformer 112, the smoothing unit 114, the detecting unit 116, the insulating unit 118, the controlling unit 120 and the switching unit 122 provided in the power supply circuit 200 have the similar structures as in the power supply circuit 100 shown in FIG. 2, respectively. Thus, the power supply circuit 200 is configured such that the PFC circuit and the main power supply circuit are integrated therein similarly as the power supply circuit 100 shown in FIG. 2, and obtains similar effects as the power supply circuit 100 shown in FIG. 2.

The smoothing unit 204 smoothes an input rectified voltage selectively output from the primary coil L1 of the insulated transformer 112 in response to a control signal, and outputs the second output signal Einv corresponding to the input rectified voltage. FIG. 2 shows the example in which the smoothing unit 204 extracts the output of the primary coil L1 of the insulated transformer 112 from a source and a drain of the switching element Q1 both configuring the switching unit 122 (in the case where the switching element Q1 is MOSFET), for example, but the smoothing unit 204 is not limited thereto. Further, the second output signal Einv is a voltage corresponding to the input rectified voltage output from the primary coil L1 of the insulated transformer 112 and thus is a non-insulated voltage. FIG. 5 shows an example in which the smoothing unit 204 is configured with a half-wave rectifying circuit configured of a diode D9 and a capacitor C9, but the smoothing unit 204 is not limited thereto.

The power supply circuit 200 can realize, with the above structure, both the functions of the PFC circuit 18 and the main power supply circuit 20 of FIG. 1 similarly as the power supply circuit 100 shown in FIG. 2. Thus, the power supply circuit 200 can realize both a correction of power factor and a stable supply of power supply similarly as the power supply circuit 100 shown in FIG. 2. Further, the power supply circuit 200 has basically the similar structure as the power supply circuit 100 shown in FIG. 2, thereby obtaining similar effects as in the power supply circuit 100.

Furthermore, the power supply circuit 200 outputs the first output voltage Eo corresponding to the induced voltage output from the secondary coil L2 of the insulated transformer 112 and the second output voltage Einv corresponding to the input rectified voltage output from the primary coil L1 of the insulated transformer 112. Thus, the power supply circuit 200 can function as a mix power supply for outputting the insulated voltage (first output voltage Eo) and the non-insulated voltage (second output voltage Einv).

The load circuit 202 is a schematic example of various circuits for realizing the respective functions of the information processing apparatus 600, and is driven by the first output voltage Eo and the second output voltage Einv supplied from the power supply circuit 200 as a power supply. The elements configuring the load circuit 202 driven at the first output voltage Eo may include various processing circuits such as MPU, magnetic recording mediums such as hard disk, and various devices, for example, but are not limited thereto. For example, the element configuring the load circuit 202 driven at the second output voltage Einv may employ a circuit such as insulated inverter but is not limited thereto.

As described above, the power supply circuit 200 according to the second embodiment of the present invention has basically the similar structure as the power supply circuit 100 according to the first embodiment shown in FIG. 2. Thus, the power supply circuit 200 can realize both a correction of power factor and a stable supply of power supply similarly as the power supply circuit 100 according to the first embodiment. The power supply circuit 200 has basically the similar structure as the power supply circuit 100 shown in FIG. 2, thereby obtaining similar effects as in the power supply circuit 100.

The power supply circuit 200 outputs the first output voltage Eo corresponding to the induced voltage output from the secondary coil L2 of the insulated transformer 112 and the second output voltage Einv corresponding to the input rectified voltage output from the primary coil L1 of the insulated transformer 112. Thus, the power supply circuit 200 can function as a mix power supply for outputting the insulated voltage (first output voltage Eo) and the non-insulated voltage (second output voltage Einv).

The information processing apparatus 600 according to the second embodiment of the present invention includes the power supply circuit 200. Thus, the information processing apparatus 600 does not need to include a plurality of power supply circuits unlike the information processing apparatus 10 in related art so that it can further reduce the number of parts of the power supply circuit than the information processing apparatus 10 and improve reliability of the power supply circuit similarly as the information processing apparatus 500. The information processing apparatus 600 does not need to include a plurality of power supply circuits unlike the information processing apparatus 10 in related art so that it can further reduce the cost for the power supply circuit than the information processing apparatus 10 and easily control the power supply circuit similarly as the information processing apparatus 500.

[Variant of the Power Supply Circuit 200 According to Second Embodiment]

The power supply circuit according to the second embodiment is not limited to the structure shown in FIG. 5, and can be configured to output a plurality of first output voltages (insulated voltages) similarly as the power supply circuit 150 according to the variant of the first embodiment shown in FIG. 4, for example.

There have been described above the embodiments of the present invention by way of the power supply circuits 100, 150 and 200, but the embodiments of the present invention are not limited thereto. The embodiments of the present invention can be applied to various devices capable of including a power supply apparatus or power supply circuit for supplying a power to an external apparatus such as AC adaptor.

The embodiments of the present invention have been described above by way of the information processing apparatuses 500 and 600, but the embodiments of the present invention are not limited thereto. The embodiments of the present invention can be applied to various devices capable of including the power supply circuit according to an embodiment of the present invention including computers such as PC (Personal Computer) or notebook type PC, TV receiver capable of receiving digital broadcast/analog broadcast, and the like, for example.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-22802 filed in the Japan Patent Office on Feb. 3, 2009, the entire content of which is hereby incorporated by reference.

What is claimed is:

1. A power supply circuit comprising:
a rectifying unit for rectifying a filtered alternating-current power supply to output a rectified input voltage;
an insulated transformer having a primary coil into which the rectified input voltage output from the rectifying unit is selectively input and a secondary coil from which an induced voltage based on the rectified input voltage input to the primary coil is output;
a first smoothing unit for smoothing the induced voltage to output a first output voltage;
a second smoothing unit for smoothing the rectified input voltage output from the primary coil and outputting a second output voltage corresponding to the rectified input voltage, the second smoothing unit comprising a diode coupled in series with a capacitor;
a detecting unit for outputting an error signal corresponding to a difference between the first output voltage and a reference voltage;
an insulating unit having an input terminal into which the error signal is input and an output terminal from which a signal corresponding to the input error signal is output, the output terminal being insulated from the input terminal;
a controlling unit for outputting a control signal for selectively inputting the rectified input voltage into the primary coil, based on the signal output from the output terminal; and
a switching unit connected to the primary coil for selectively inputting the rectified input voltage into the primary coil, based on the control signal.

2. The power supply circuit according to claim 1, wherein the rectifying unit rectifies the alternating-current power supply without smoothing.

3. The power supply circuit according to claim 1,
wherein the insulated transformer includes a plurality of secondary coils for outputting an induced voltage based on the rectified input voltage applied to the primary coil, and
wherein the first smoothing unit includes a plurality of smoothing circuits, each of which is connected to each of the plurality of secondary coils and smoothes an induced voltage output from the each of the secondary coils.

4. The power supply circuit according to claim 3, wherein turns of each of the plurality of secondary coils are different from one another.

5. An information processing apparatus comprising:
a power supply circuit for outputting a first output voltage based on a filtered alternating-current power supply; and
a load circuit powered by the first output voltage, wherein the power supply circuit includes
a rectifying unit for rectifying an alternating-current power supply to output a rectified input voltage,
an insulated transformer having a primary coil into which the rectified input voltage output from the rectifying unit is selectively input and a secondary coil from which an induced voltage based on the rectified input voltage input to the primary coil is output,
a first smoothing unit for smoothing the induced voltage to output a first output voltage,
a second smoothing unit for smoothing the rectified input voltage output from the primary coil and outputting a second output voltage corresponding to the rectified input voltage, the second smoothing unit comprising a diode coupled in series with a capacitor;
a detecting unit for outputting an error signal corresponding to a difference between the first output voltage and a reference voltage,
an insulating unit having an input terminal into which the error signal is input and an output terminal from which a signal corresponding to the error signal is output, the output terminal being insulated from the input terminal,
a controlling unit for outputting a control signal for selectively inputting the rectified input voltage into the primary coil, based on the signal output from the output terminal, and
a switching unit connected to the primary coil for selectively inputting the rectified input voltage into the primary coil, based on the control signal.

6. The information processing apparatus according to claim 5, wherein the rectifying unit rectifies the alternating-current power supply without smoothing.

7. The information processing apparatus according to claim 5,
wherein the insulated transformer includes a plurality of secondary coils for outputting an induced voltage based on the rectified input voltage applied to the primary coil, and
wherein the first smoothing unit includes a plurality of smoothing circuits, each of which is connected to each of the plurality of secondary coils and smoothes an induced voltage output from the each of the secondary coils.

8. The information processing apparatus according to claim 7, wherein turns of each of the plurality of secondary coils are different from one another.

* * * * *